United States Patent
Brennan, III

(10) Patent No.: US 9,657,863 B2
(45) Date of Patent: May 23, 2017

(54) SAMPLE VALVE SYSTEMS AND METHODS

(71) Applicant: Schlumberger Technology Corporation, Sugar Land, TX (US)

(72) Inventor: William Ewan Brennan, III, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 750 days.

(21) Appl. No.: 14/015,539

(22) Filed: Aug. 30, 2013

(65) Prior Publication Data
US 2014/0060657 A1     Mar. 6, 2014

Related U.S. Application Data

(60) Provisional application No. 61/695,279, filed on Aug. 30, 2012.

(51) Int. Cl.
*F16K 31/02* (2006.01)
*F16K 37/00* (2006.01)
*F16K 17/164* (2006.01)
*F16K 17/40* (2006.01)
*F16K 17/38* (2006.01)
(Continued)

(52) U.S. Cl.
CPC ............ *F16K 31/025* (2013.01); *A62C 37/10* (2013.01); *A62C 37/11* (2013.01); *A62C 37/12* (2013.01); *E21B 49/10* (2013.01); *F16K 11/0704* (2013.01); *F16K 13/04* (2013.01); *F16K 17/164* (2013.01); *F16K 17/36* (2013.01); *F16K 17/383* (2013.01); *F16K 17/40* (2013.01); *F16K 17/406* (2013.01); *F16K 37/0041* (2013.01); *Y10T 137/0318* (2015.04); *Y10T 137/1827* (2015.04); *Y10T 137/7723* (2015.04); *Y10T 137/8242* (2015.04)

(58) Field of Classification Search
CPC ...... F16K 37/0041; F16K 17/40; F16K 17/36; F16K 17/406; F16K 17/164; F16K 31/025; F16K 17/383; Y10T 137/8242; Y10T 137/7723; A62C 37/10; A62C 37/11; A62C 37/12
See application file for complete search history.

(56) References Cited

U.S. PATENT DOCUMENTS

| | | | | |
|---|---|---|---|---|
| 922,300 | A | * | 5/1909 | Lindenberger .......... F16K 31/56 137/487.5 |
| 2,667,896 | A | * | 2/1954 | Kanuch ................ F16K 17/164 137/464 |

(Continued)

FOREIGN PATENT DOCUMENTS

WO     2005109140 A1     11/2005

*Primary Examiner* — Atif Chaudry
(74) *Attorney, Agent, or Firm* — Michael Dae

(57) ABSTRACT

The present disclosure relates to a valve system that includes a valve having a spool moveable from an un-actuated position to an actuated position in response to actuation of the valve. The valve system also includes a wire to secure the valve in the un-actuated position, a first resistor electrically coupled with the wire and configured to release the wire to actuate the valve and move a first component coupled to the wire toward a second component, and a second resistor electrically coupled with the wire to detect connection of the first component with the second component.

10 Claims, 13 Drawing Sheets

(51) Int. Cl.
*F16K 17/36* (2006.01)
*A62C 37/10* (2006.01)
*A62C 37/11* (2006.01)
*A62C 37/12* (2006.01)
*E21B 49/10* (2006.01)
*F16K 11/07* (2006.01)

(56) References Cited

U.S. PATENT DOCUMENTS

| | | | | |
|---|---|---|---|---|
| 3,706,321 | A * | 12/1972 | Vicari | F16K 3/0254 |
| | | | | 137/554 |
| 6,073,914 | A * | 6/2000 | Roth | B64G 1/222 |
| | | | | 254/29 A |
| 7,518,523 | B2 | 4/2009 | Yuan et al. | |
| 7,635,004 | B2 * | 12/2009 | Rudoy | F16K 17/406 |
| | | | | 137/70 |
| 7,788,983 | B2 | 9/2010 | Hansson et al. | |
| 8,146,679 | B2 | 4/2012 | Downton | |
| 8,973,610 | B2 * | 3/2015 | Ma | F15B 13/0422 |
| | | | | 137/596.14 |
| 2011/0017310 | A1 | 1/2011 | Eriksson | |
| 2012/0325322 | A1 | 12/2012 | Li et al. | |

\* cited by examiner

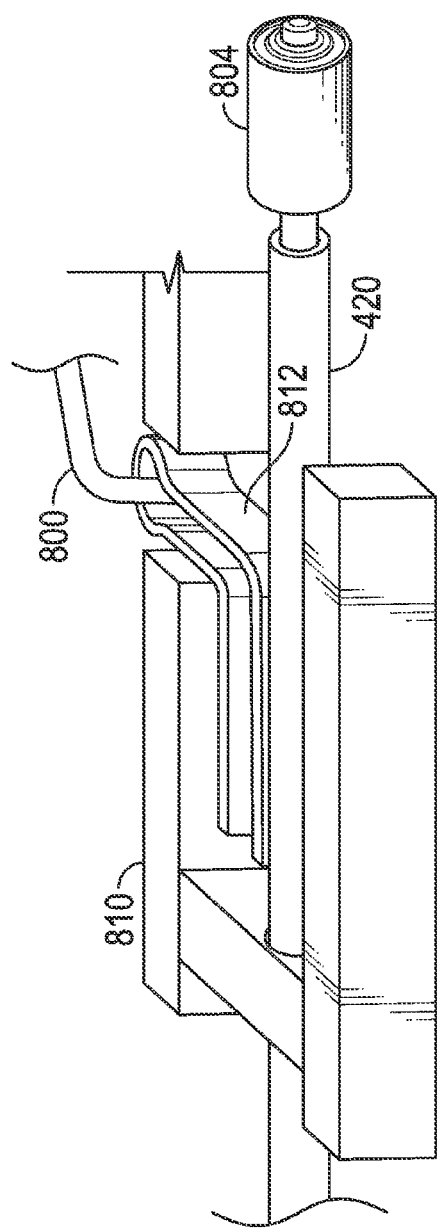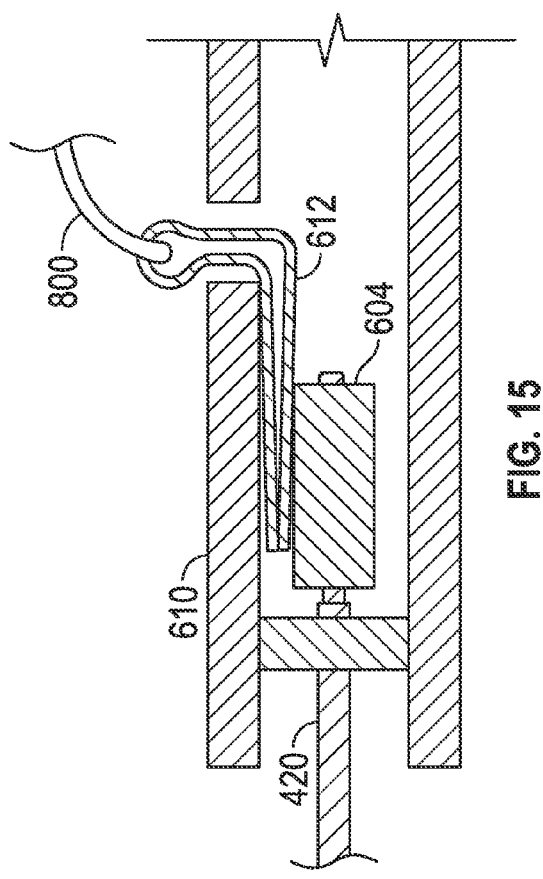

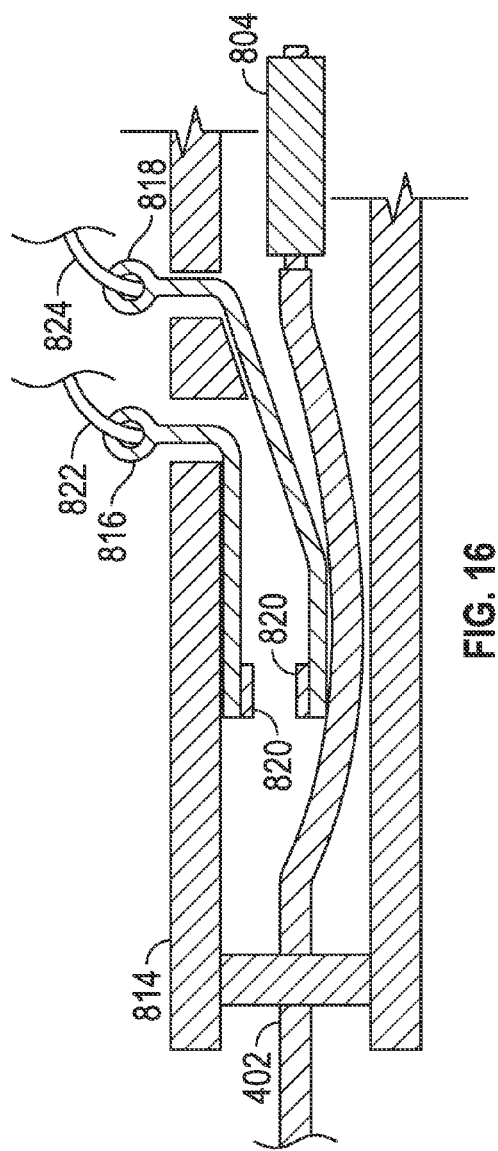
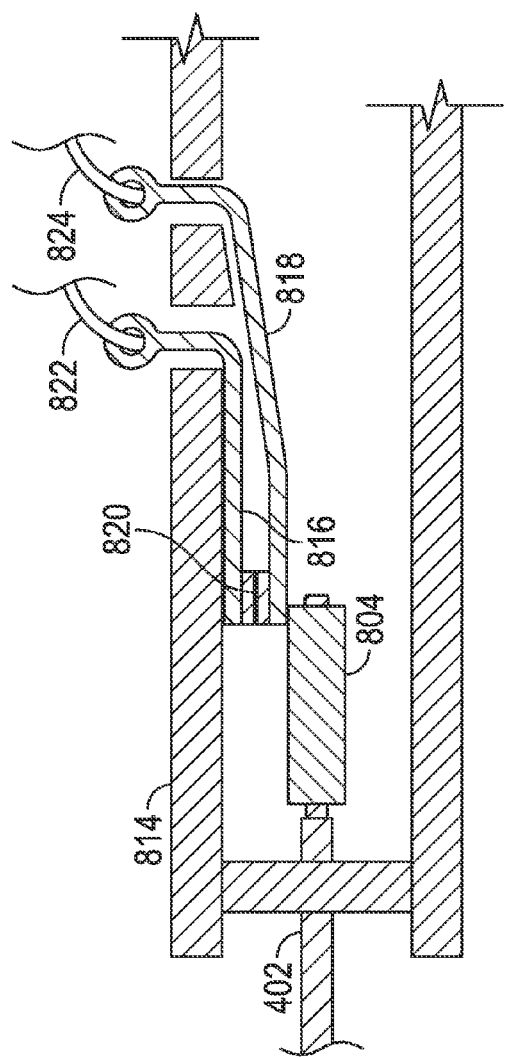

SAMPLE VALVE SYSTEMS AND METHODS

CROSS-REFERENCE TO RELATED APPLICATIONS

This application claims the benefit of U.S. Provisional Application No. 61/695,279, entitled "Sample Valve Systems and Methods," filed Aug. 30, 2012, which is hereby incorporated herein by reference in its entirety.

BACKGROUND OF THE DISCLOSURE

The disclosure relates generally to sample valve systems and methods that can be employed in downhole tools.

Wellbores (also known as boreholes) are drilled to penetrate subterranean formations for hydrocarbon prospecting and production. During drilling operations, evaluations may be performed on the subterranean formation for various purposes, such as to locate hydrocarbon-producing formations and manage the production of hydrocarbons from these formations. To conduct formation evaluations, the drill string may include one or more drilling tools that test and/or sample the surrounding formation, or the drill string may be removed from the wellbore, and a wireline tool may be deployed into the wellbore to test and/or sample the formation. These drilling tools and wireline tools, as well as other wellbore tools conveyed on coiled tubing, drill pipe, casing or other conveyers, are also referred to herein as "downhole tools."

Formation evaluation may involve drawing fluid from the formation into a downhole tool for testing and/or sampling. Various fluid communication devices, such as probes, are typically extended from the downhole tool and placed in contact with the wellbore wall to establish fluid communication with the formation surrounding the wellbore and to draw fluid into the downhole tool. In cases where a sample of fluid drawn into the tool is desired, a sample may be collected in one or more sample chambers or bottles positioned in the downhole tool. A system of valves may be employed to direct the fluid into different sample chambers and to seal the sample chambers downhole.

SUMMARY

The present disclosure relates to a valve system that includes a valve having a spool moveable from an un-actuated position to an actuated position in response to actuation of the valve. The valve system also includes a wire to secure the valve in the un-actuated position, a first resistor electrically coupled with the wire and designed to release the wire to actuate the valve and move a first component coupled to the wire toward a second component, and a second resistor electrically coupled with the wire to detect connection of the first component with the second component.

The present disclosure also relates to a valve system that includes a valve having a spool slidable within a sleeve from an un-actuated position to an actuated position in response to actuation of the valve. The valve system also includes a wire coupled to a plurality of release washer segments to retain the plurality of release washer segments in a contracted state that secures the spool within the sleeve in the un-actuated position. The valve system further includes a first resistor electrically coupled with the wire and designed to release the wire to expand the plurality or release washer segments away from one another to move a first component coupled to the wire toward a second component and to allow the spool to slide within the sleeve to the actuated position. The valve system also includes a second resistor electrically coupled with the wire to detect connection of the first component with the second component.

The present disclosure further relates to a method that includes releasing a wire to move a spool from an un-actuated position to an actuated position to actuate a valve, expanding a plurality of segments of a release washer away from one another in response to the movement of the spool, and moving a first component coupled to the wire toward a second component in response to the expansion of the plurality of segments. The method further includes detecting a successful actuation of the valve based on a voltage change produced by the first component contacting the second component.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 14 is a perspective view of another embodiment of a release washer, incorporating a valve shift detection system, that can be employed in the sample directing valves of FIGS. 3-5, according to aspects of the present disclosure;

FIG. 15 is a top view of the release washer of FIG. 14 in the actuated position, according to aspects of the present disclosure;

FIG. 16 is a top view of another embodiment of a release washer, incorporating a valve shift detection system, that can be employed in the sample directing valves of FIGS. 3-5, according to aspects of the present disclosure;

FIG. 17 is a top view of the release washer of FIG. 16 in the actuated position, according to aspects of the present disclosure;

DETAILED DESCRIPTION

It is to be understood that the present disclosure provides many different embodiments, or examples, for implementing different features of various embodiments. Specific examples of components and arrangements are described below to simplify the present disclosure. These are, of course, merely examples and are not intended to be limiting.

The present disclosure relates to valve shift detection systems that can be employed to determine when a valve has shifted. The valve shift detection systems described herein may be employed in downhole tools to detect shifting of spool valves. However, in other embodiments, the valve shift detection systems may be employed to detect shifting of spool valves employed in other environments, as well as to detect shifting of other types of valves. According to certain embodiments, the valve shift detection systems may include a switch integrated into a release washer activation wire. The switch may be closed upon expansion of the release washer and shifting of the spool valve. In certain embodiments, the switch may include a first component, coupled to the end of the wire, that contacts a second component, in response to expansion of the release washer, to complete an electrical connection. For example, the activation wire may be disposed around segments of the release washer to secure the release washer in the contracted position. A first resistor in the activation wire may be heated to sever or release a portion of the wire, which allows the segments to expand away from one another. The expansion of the segments may cause the first component to move toward and contact the second component, which completes an electrical connection. A second resistor in the activation wire may be electrically coupled to a status circuit to detect the electrical connection.

Figure 1:
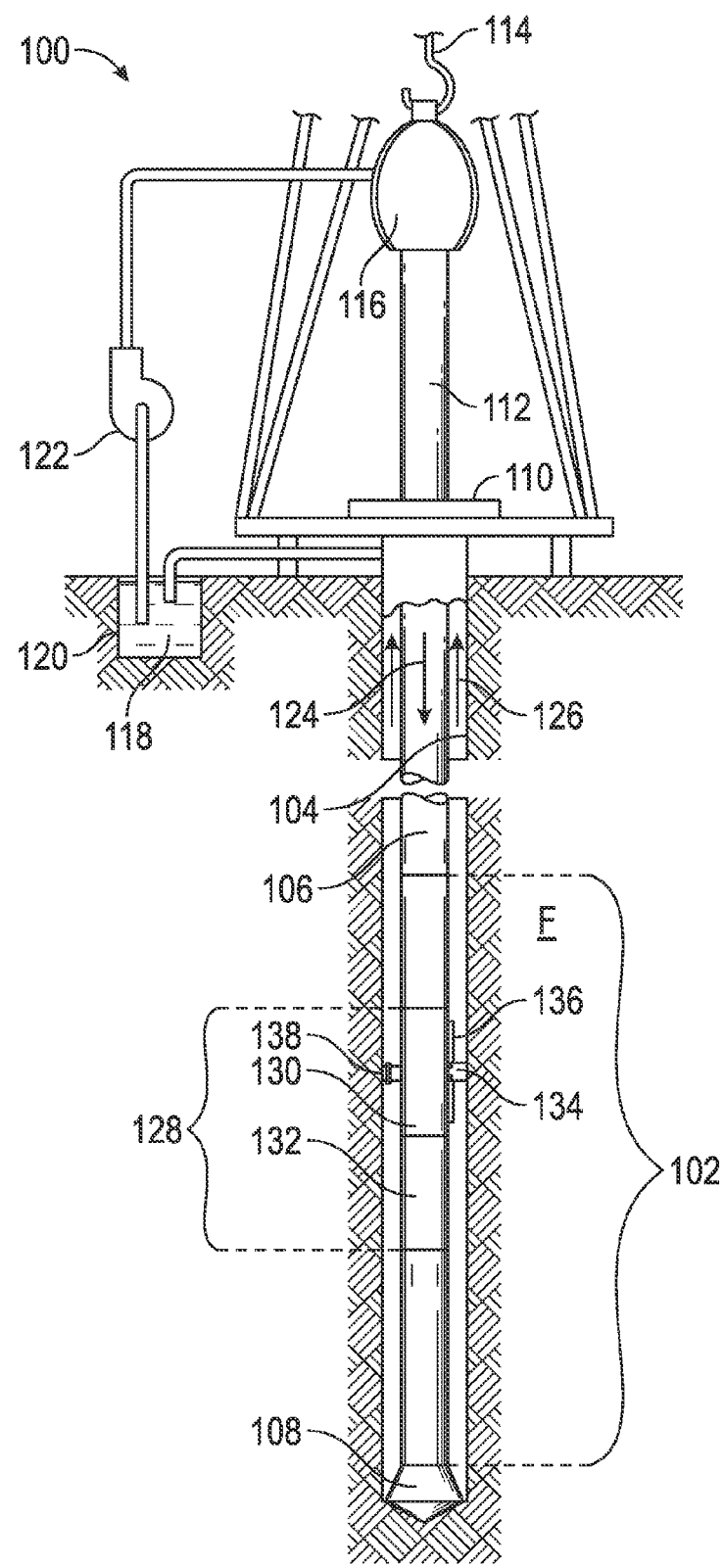
FIG. 1 is a schematic view of an embodiment of a wellsite system that may employ valve shift detection systems, according to aspects of the present disclosure.
Figure 2:
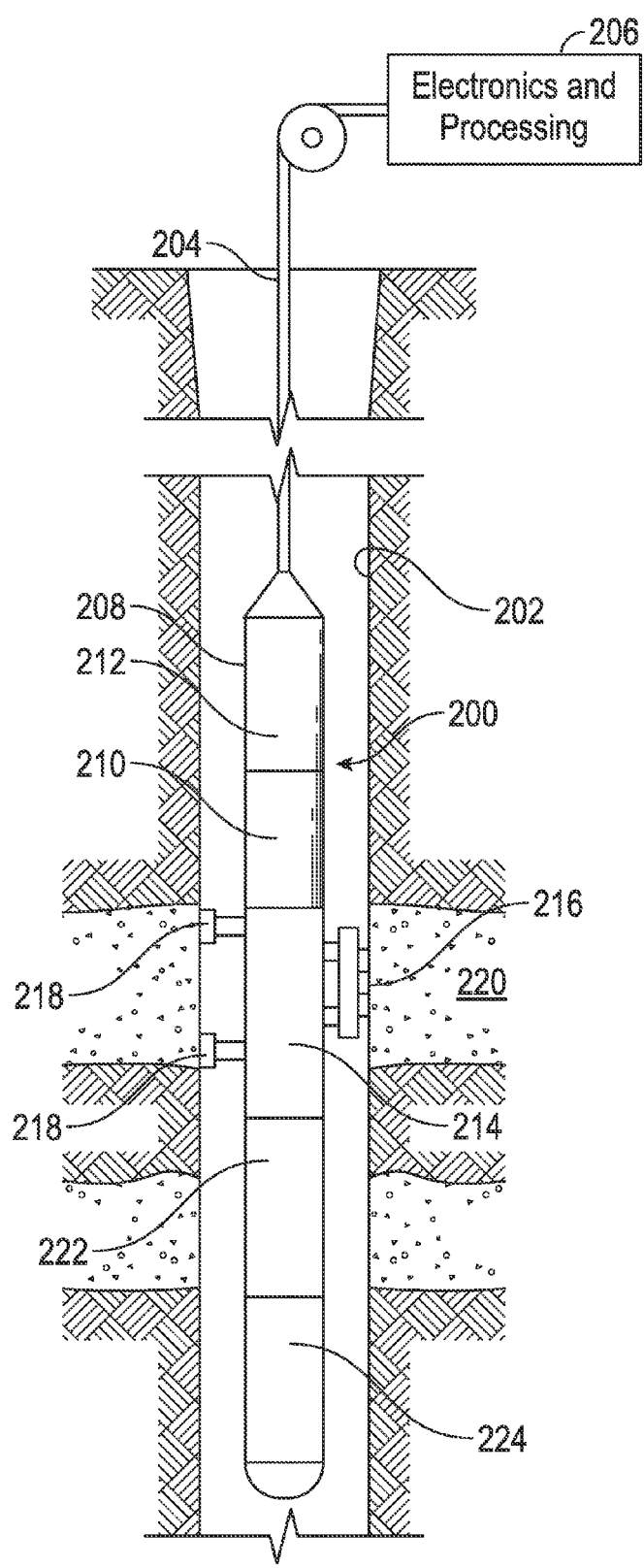
FIG. 2 is a schematic view of another embodiment of a wellsite system that may employ valve shift detection systems, according to aspects of the present disclosure.

FIGS. 1 and 2 depict examples of wellsite systems that may employ the valve shift detection systems and techniques described herein. FIG. 1 depicts a rig 100 with a downhole tool 102 suspended therefrom and into a wellbore 104 via a drill string 106. The downhole tool 100 has a drill bit 108 at its lower end thereof that is used to advance the downhole tool into the formation and form the wellbore. The drillstring 106 is rotated by a rotary table 110, energized by means not shown, which engages a kelly 112 at the upper end of the drillstring 106. The drillstring 106 is suspended from a hook 114, attached to a traveling block (also not shown), through the kelly 112 and a rotary swivel 116 that permits rotation of the drillstring 106 relative to the hook 114. The rig 100 is depicted as a land-based platform and derrick assembly used to form the wellbore 104 by rotary drilling. However, in other embodiments, the rig 100 may be an offshore platform.

Drilling fluid or mud 118 is stored in a pit 120 formed at the well site. A pump 122 delivers the drilling fluid 118 to the interior of the drillstring 106 via a port in the swivel 116, inducing the drilling fluid to flow downwardly through the drillstring 106 as indicated by a directional arrow 124. The drilling fluid exits the drillstring 106 via ports in the drill bit 108, and then circulates upwardly through the region between the outside of the drillstring and the wall of the wellbore, called the annulus, as indicated by directional arrows 126. The drilling fluid lubricates the drill bit 108 and carries formation cuttings up to the surface as it is returned to the pit 120 for recirculation.

The downhole tool 102, sometimes referred to as a bottom hole assembly ("BHA"), may be positioned near the drill bit 108 and includes various components with capabilities, such as measuring, processing, and storing information, as well as communicating with the surface. A telemetry device (not shown) also may be provided for communicating with a surface unit (not shown).

The downhole tool 102 further includes a sampling system 128 including a fluid communication module 130 and a sampling module 132. The modules may be housed in a drill collar for performing various formation evaluation functions, such as pressure testing and sampling, among others. According to certain embodiments, the sampling system 128 may be employed "while drilling," meaning that the sampling system 128 may be operated during breaks in operation of the mud pump 122 and/or during breaks in operation of the drill bit 108. As shown in FIG. 1, the fluid communication module 130 is positioned adjacent the sampling module 132; however the position of the fluid communication module 130, as well as other modules, may vary in other embodiments. Additional devices, such as pumps, gauges, sensor, monitors or other devices usable in downhole sampling and/or testing also may be provided. The additional devices may be incorporated into modules 130 and 132 or disposed within separate modules included within the sampling system 128.

The fluid communication module 130 includes a probe 134, which may be positioned in a stabilizer blade or rib 136. The probe 134 includes one or more inlets for receiving formation fluid and one or more flowlines (not shown) extending into the downhole tool for passing fluids through the tool. In certain embodiments, the probe 134 may include a single inlet designed to direct formation fluid into a flowline within the downhole tool. Further, in other embodiments, the probe may include multiple inlets that may, for example, be used for focused sampling. In these embodiments, the probe may be connected to a sampling flow line, as well as to guard flow lines. The probe 134 may be movable between extended and retracted positions for selectively engaging a wall of the wellbore 104 and acquiring fluid samples from the formation F. One or more setting pistons 138 may be provided to assist in positioning the fluid communication device against the wellbore wall.

FIG. 2 depicts an example of a wireline downhole tool 200 that may employ the sample valve systems and techniques described herein. The downhole tool 200 is suspended in a wellbore 202 from the lower end of a multi-conductor cable 204 that is spooled on a winch (not shown) at the surface. The cable 204 is communicatively coupled to an electronics and processing system 206. The downhole tool 200 includes an elongated body 208 that houses modules 210, 212, 214, 222, and 224, that provide various functionalities including fluid sampling, fluid testing, operational control, and communication, among others. For example, the modules 210 and 212 may provide additional functionality such as fluid analysis, resistivity measurements, operational control, communications, coring, and/or imaging, among others.

As shown in FIG. 2, the module 214 is a fluid communication module 214 that has a selectively extendable probe 216 and backup pistons 218 that are arranged on opposite sides of the elongated body 208. The extendable probe 216 is configured to selectively seal off or isolate selected portions of the wall of the wellbore 202 to fluidly couple to the adjacent formation 220 and/or to draw fluid samples from the formation 220. The probe 216 may include a single inlet or multiple inlets designed for guarded or focused sampling. The formation fluid may be expelled to the wellbore through a port in the body 208 or the formation fluid may be sent to one or more fluid sampling modules 222 and 224. The fluid sampling modules 222 and 224 may include sample chambers that store the formation fluid. In the illustrated example, the electronics and processing system 206 and/or a downhole control system are configured to control the extendable probe assembly 216 and/or the drawing of a fluid sample from the formation 220.

Figure 3:
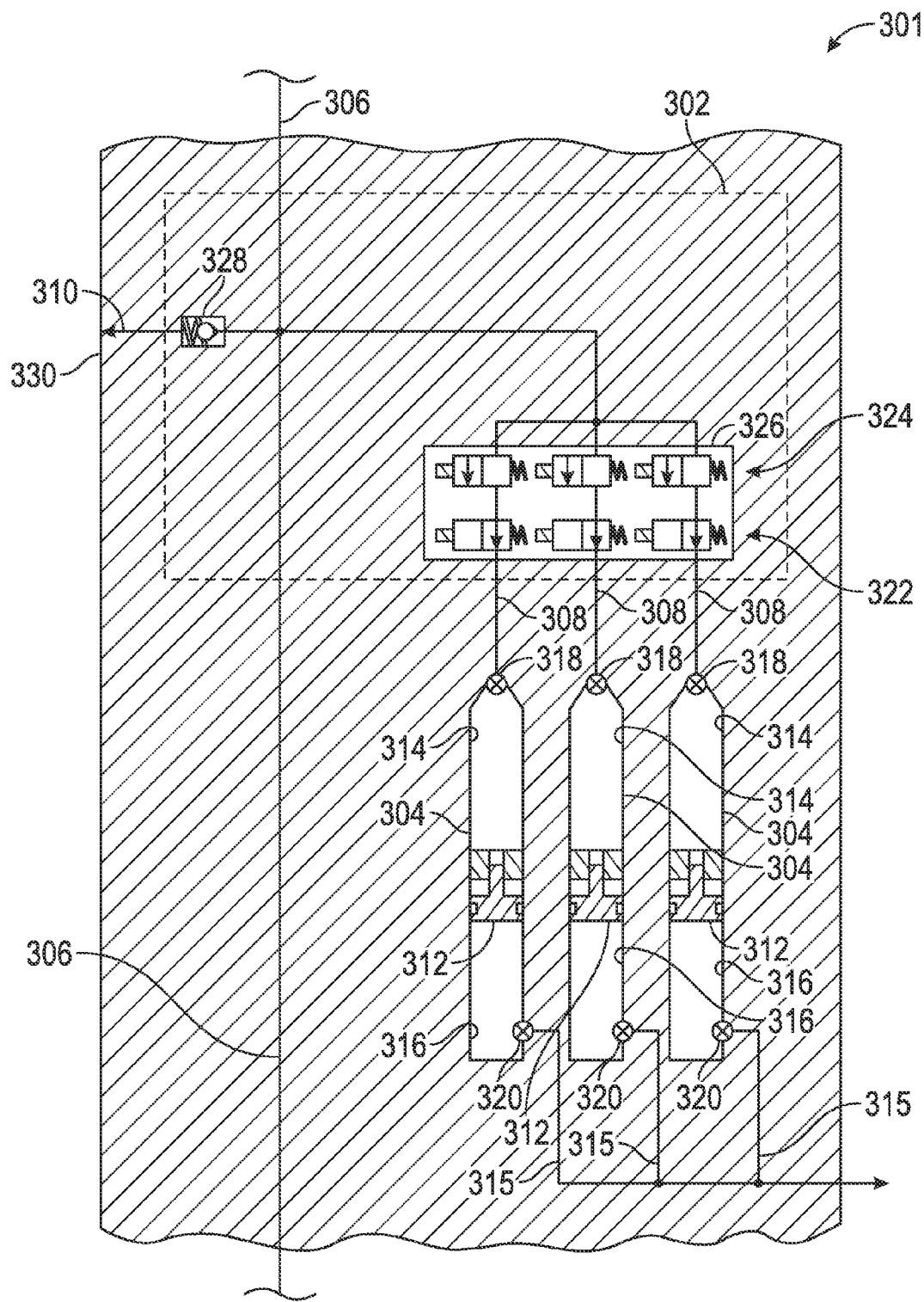
FIG. 3 is a schematic representation of a portion of a sample collection system that includes sample directing valves with valve shift detection systems; according to aspects of the present disclosure.

FIG. 3 is a schematic representation of a portion of a sample collection system 300 that may be employed within a sampling module. For example, the sample collection system 300 may be employed in the sampling modules 132, 222, and 224, described above with respect to FIGS. 1 and 2. Further, the sample collection system 300 may be employed in other downhole tools, such as tools conveyed downhole on wired drill pipe or coiled tubing.

The sample collection system 300 includes a flow diverter 302 for selectively diverting flow through the sampling module and into sample chambers 314 included within the sample collection system 300. The flow diverter 302 selectively diverts fluid from the primary flowline 306 that extends through the sampling module to secondary flowlines 308 that lead to sample chambers 304. The flow diverter 302 also may divert fluid from the primary flowline 306 to an exit flowline 310 leading to the wellbore.

The secondary flowlines 308 branch off from primary flowline 306 and extend to sample chambers 304. The sample chambers may be any type of sample chamber known in the art to capture downhole fluid samples. As shown, the sample chambers include a slidable piston 312 defining a variable volume sample cavity 314 and a variable volume buffer cavity 316. The sample cavity 314 is designed to receive the fluid from the secondary flowlines 308 and to store the fluid sample. The buffer cavity 316 contains a buffer fluid that applies a pressure to the piston 312 to maintain a pressure differential between the cavities 314 and 316 sufficient to maintain the pressure of the sample as it flows into the sample cavity. According to certain embodiments, additional features, such as pressure compensators, pressure chambers, sensors and other components also may be included within the sample chambers 304 as desired.

Each sample chamber 304 includes sample chamber valves 318 and 320. The chamber valves 318 provide selective fluid communications between the sample cavities 314 and the secondary flowlines 308. The chamber valves 320 provide selective fluid communications between the buffer cavities 316 and a pressure source, such as the wellbore, a nitrogen charging chamber, or other pressure source. Each sample chamber 314 is also fluidly coupled to a set of sample directing valves 322 and 324 disposed in a housing, such as a valve block 326, for controlling the flow of fluid into a sample chamber 304.

One or more of the sample directing valves 322 and 324 may be selectively activated, sequentially or independently, to permit fluid from the flowline 310 to enter the sample cavity of one or more of the sample chambers 314. According to certain embodiments, the sample directing valves 322 may be normally closed valves, and the sample directing valves 324 may be normally open valves 324. As discussed further below, the valves 322 and 324 may include a spring-loaded stem (e.g., a spool) that biases the valves to either an open or closed position. The sample directing valves 322 and 324 may be selectively actuated to route the sample fluid into the various sample chambers 304. After a sample of fluid has been collected within a sample chamber 304, the corresponding normally open valve 324 and the corresponding valve 318 may be closed to seal the sample within the sample cavity 314 of the respective sample chamber 304.

In certain embodiments, additional valves may be provided in various locations about the flowlines to permit selective fluid communication between locations. For example, a valve 328, such as a relief or check valve, is disposed in the exit flowline 310 to allow selective fluid communication with the wellbore. For example, fluid may be directed through the exit flowline 310 out of a tool body's sidewall 330 and into the wellbore. The valve 328 also may be set to open to the wellbore at a given differential pressure setting. For example, the valve 328 may be a relief or seal valve that is controlled passively, actively or by a preset relief pressure. The valve 328 may be used to flush the flowline 306 before sampling and/or to prevent over-pressuring of fluid samples pumped into the respective sample chambers 304. The relief valve also may be employed as a safety valve to prevent trapping high pressure at the surface. One or more of the valves may be remotely controlled from the surface, for example, by using mud-pulse telemetry, wired drill pipe communications, or a wireline cable, among others. Downhole processors also may be provided for such actuation. Further, in other embodiments, one or more of the valves may be manually actuated.

Figure 4:
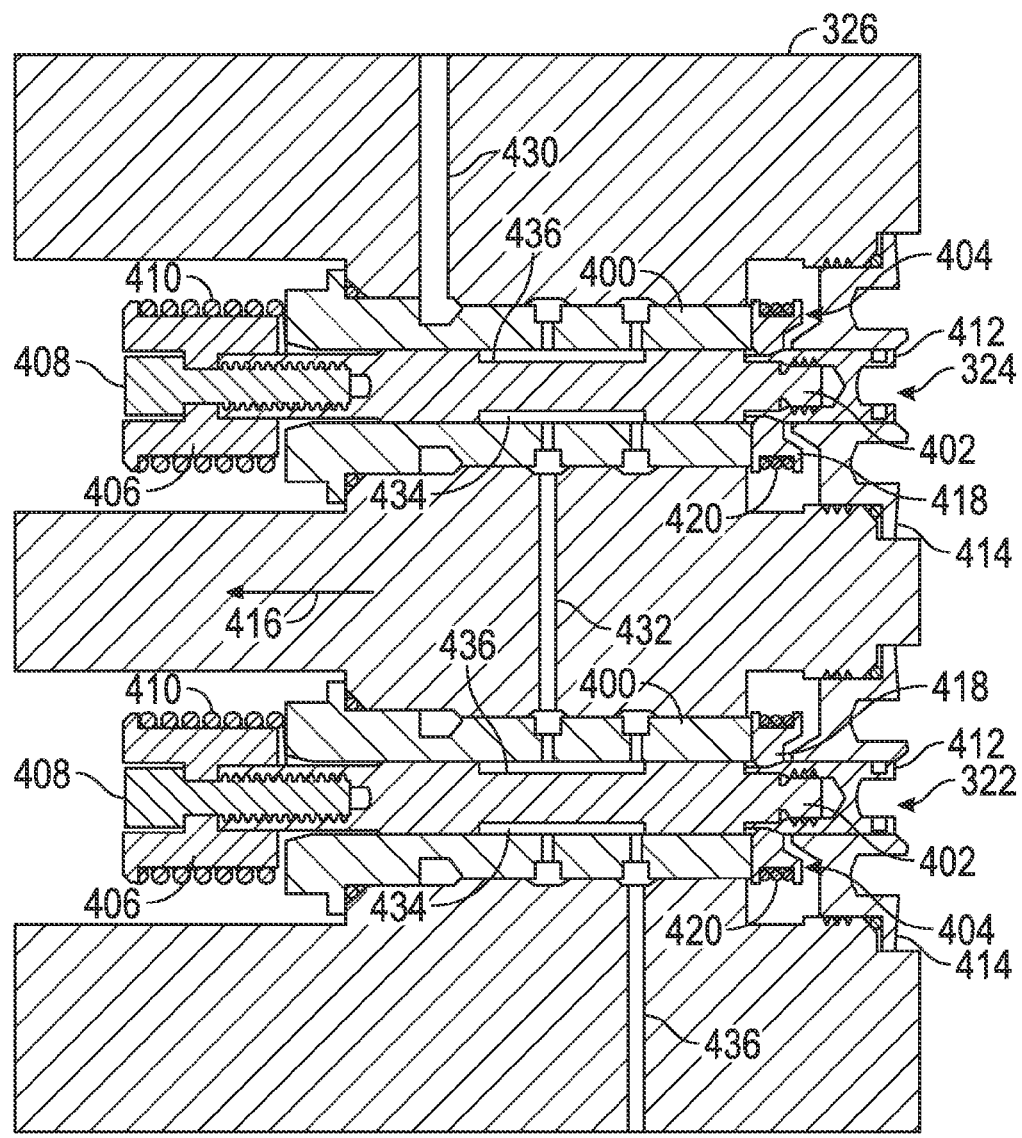
FIG. 4 is a cross-sectional view of an embodiment of sample directing valves that may be employed in the sample collection system of FIG. 3, according to aspects of the present disclosure.
Figure 5:
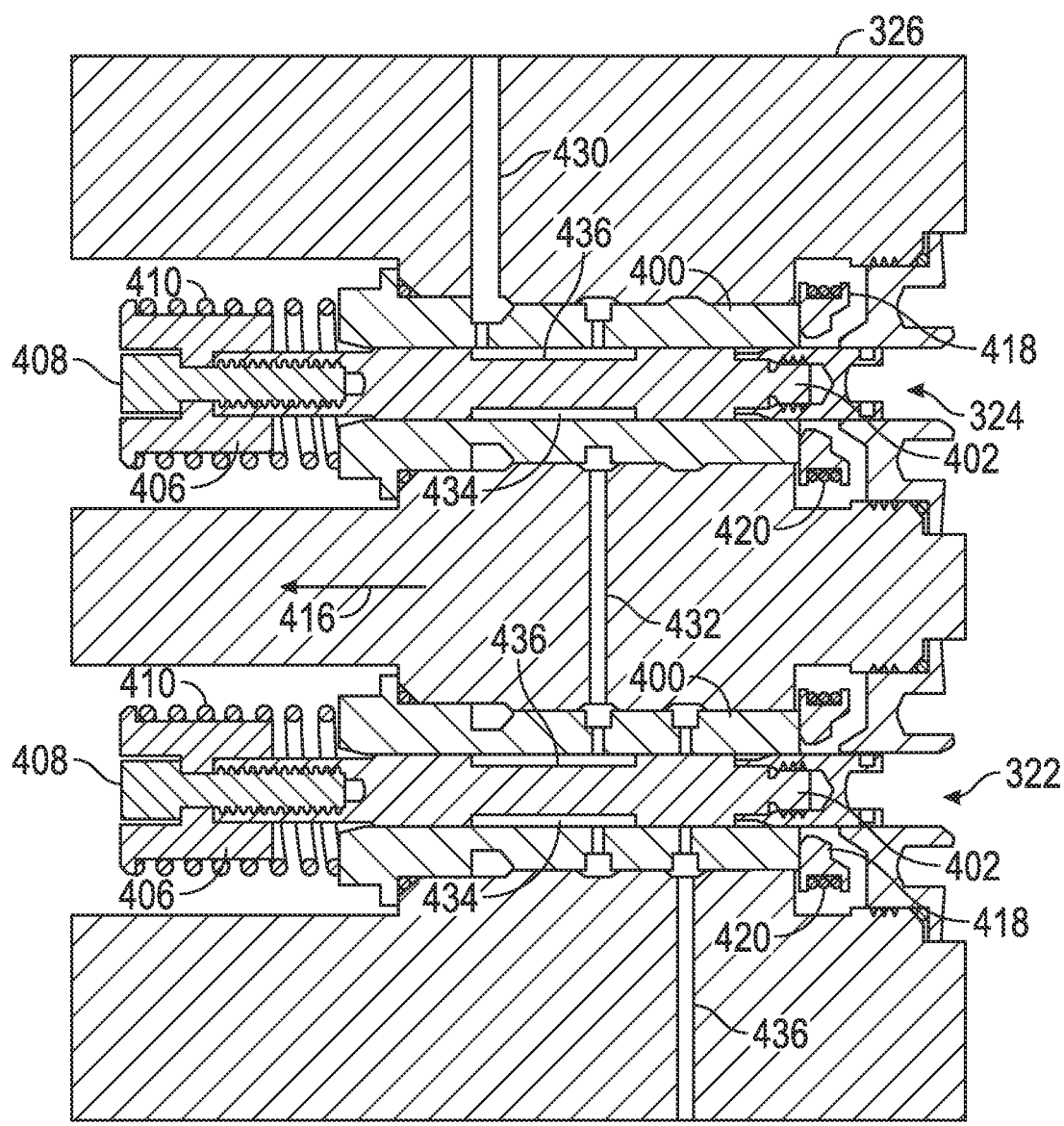
FIG. 5 is a cross-sectional view of the sample directing valves of FIG. 4 in the actuated position, according to aspects of the present disclosure.

FIGS. 4 to 7 depict embodiments of sample directing valves 322 and 324 that may employ the valve shift detection systems and techniques described herein. The sample directing valves 322 and 324 may be disposed in the valve block 326. FIG. 4 depicts the valves 322 and 324 in the un-actuated position, and FIG. 5 depicts the valves 322 and 324 in the actuated position. As shown in FIG. 4, valve 324 is normally closed and valve 322 is normally open. Each valve 322 and 324 includes a sleeve 400 that is fastened to the valve block 326. Each valve 322 and 324 also includes a spool 402 that can slide in the sleeve 400 to isolate or open a flow path to a sample chamber 304. One end of each spool 402 extends through a release washer 404, while the other end of each spool is fastened to a spring retainer 406 by a fastener 408, such as a screw. A spring 410 is disposed on each spring retainer 406. The end of the spool 402 that is inserted through the release washer 404 is enclosed by a cap 412 disposed through a port cover 414. When each valve 322 and 324 is in the un-actuated position, the profile of the release washer 404 inhibits the cap 412 and connected spool 402 from moving in the direction of arrow 416, which would release tension in the spring 410 and slide the spool 402 within the sleeve 400.

Figure 7:
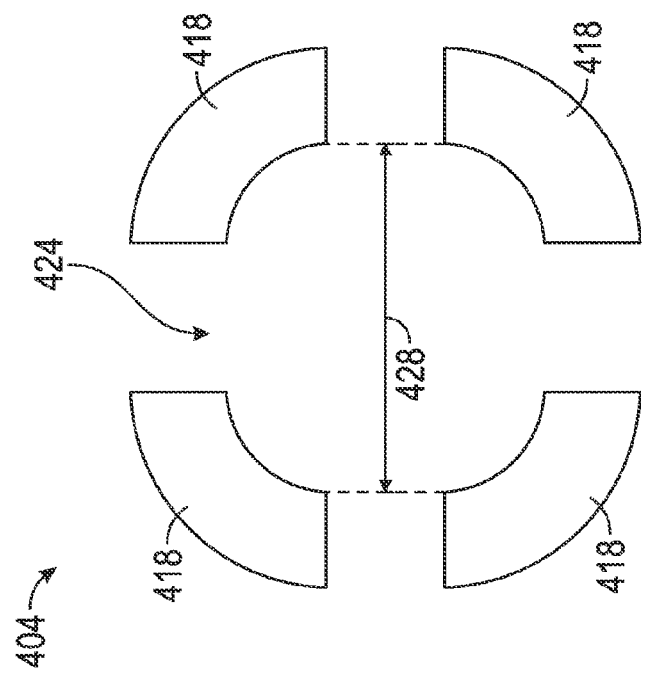
FIG. 7 is a schematic representation of the release washer of FIG. 6 in the expanded position, according to aspects of the present disclosure.
Figure 6:
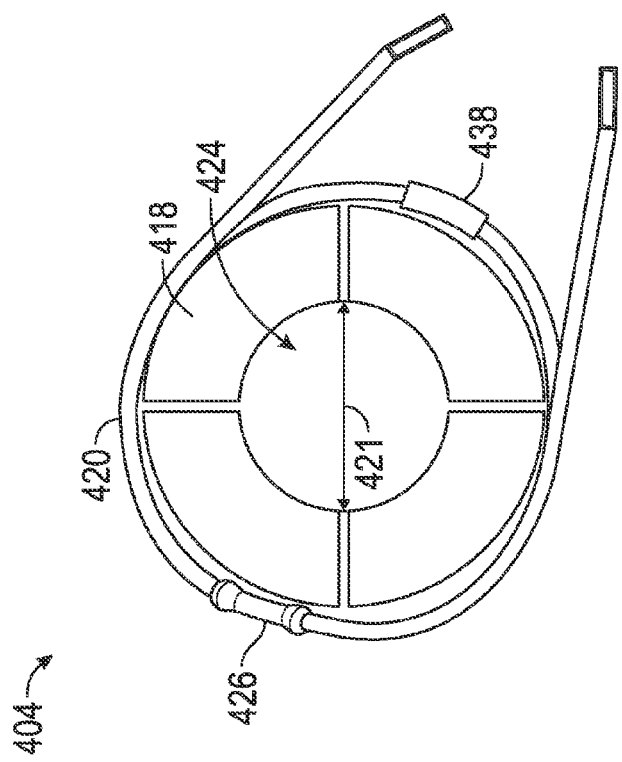
FIG. 6 is a schematic representation of a release washer that may be employed in the sample directing valves of FIGS. 3-5, according to aspects of the present disclosure.
Figure 10:
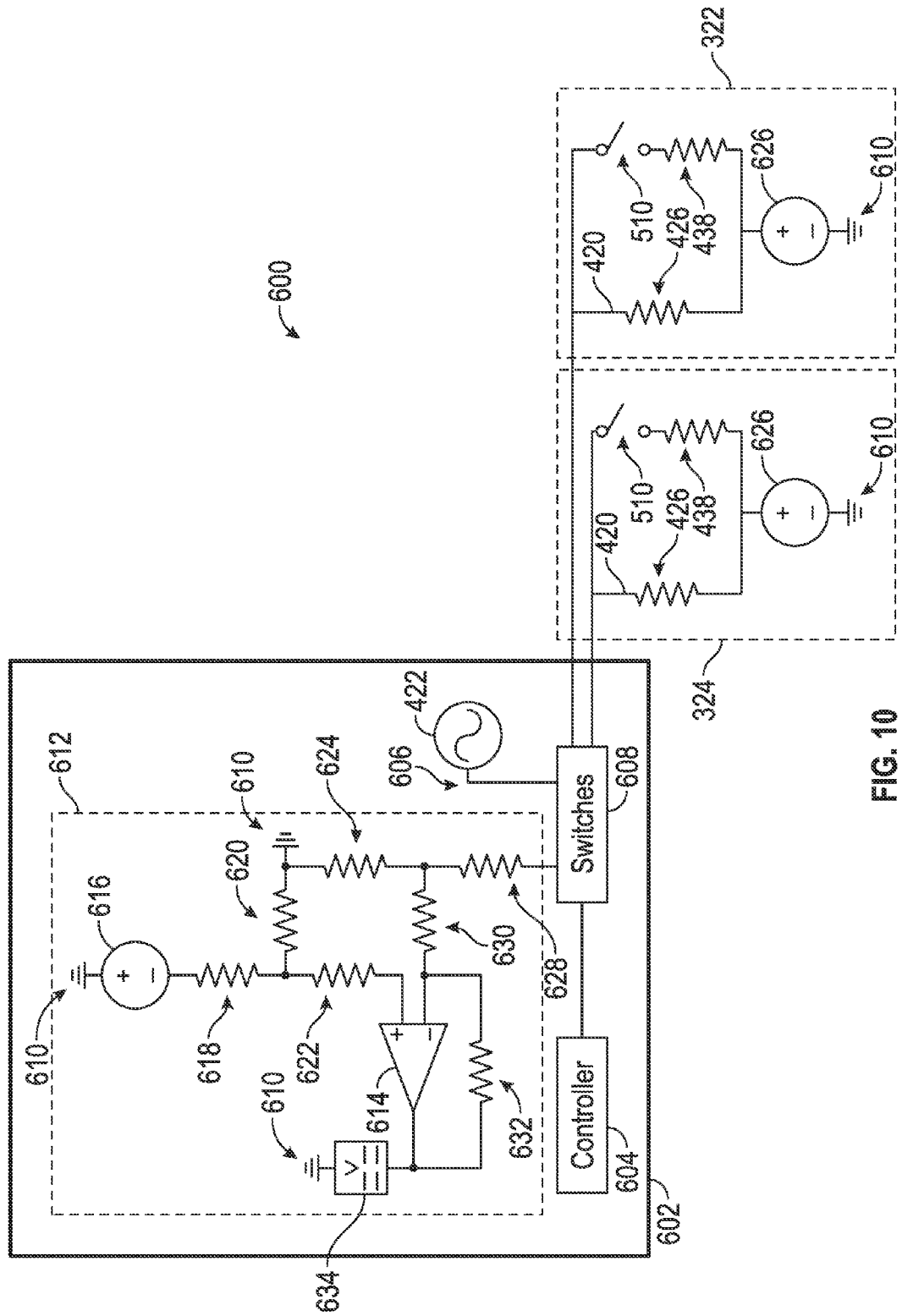
FIG. 10 is a schematic representation of an embodiment of a valve shift detection system, according to aspects of the present disclosure.

As shown in FIGS. 6 and 7, the release washer 404 includes segments 418 held in place by an activation wire 420, such as an exothermic wire (i.e. an "exo-wire"), or other suitable releasable wire. As shown in FIG. 6, the wire 420 is wrapped around the release washer 404 to hold the segments 418 together and provide a relatively small internal diameter 421 for a central opening 424 of the release washer 404. The small internal diameter 421 inhibits movement of the cap 412, and connected spool valve, in the direction 416. As shown in FIG. 10, the wire 420 includes a resistor 426 that may be connected to a current source 422 within the downhole tool. To fire the valves 322 and 324, a current is passed through the wire 420 and the resistor 426. In response to the current, the resistor 426 increases in temperature, which melts a portion of the wire 420, or a portion of a link retaining the segments 418 (e.g., a hook, solder, spring or other component in the wire or attached to the wire), allowing the segments 418 to expand away from one another, as shown in FIG. 7.

When the segments 418 move apart, the internal diameter 421 increases to an enlarged diameter 428, which allows the cap 412 and end of the spool 402 to move through the center 424 of the release washer 404, as shown in FIG. 5. The spring 410 also expands as shown in FIG. 5, pulling the spool 402 in the direction 416. The shifting of the spool 402 changes the flow path through the valve block 326. For example, as shown in FIG. 4, the valve 324 is un-actuated and in the normally closed position. Accordingly, the flow path 430, which receives fluid from the primary flowline 306 (FIG. 3), is not fluidly connected to the flow path 432 in the valve block 326. In this position, fluid is inhibited from flowing through the valve block 326 and into a sample chamber 304. However, when the valve 324 is actuated, the spool 402 shifts in the direction 416 so that the flow path 430 is connected to the flow path 432 through a chamber 434 formed by a recessed portion 436 of the spool 402 and the sleeve 400. Accordingly, when the valve 324 is actuated, fluid may flow through the flow path 430, the valve 324, and the flow path 432 to the valve 322.

As shown in FIG. 4 the valve 322 is normally open in the un-actuated position. Accordingly, fluid may flow from the flow path 432, through the chamber 434 in the valve 322, to the flow path 436 which leads to a sample chamber 304. To capture a sample of fluid, the valve 324 may be actuated, as shown in FIG. 5, while the valve 322 is un-actuated, as shown in FIG. 4. In these positions, fluid may flow through the flow path 430, the valve 324, the flow path 432, the valve 322, and the flow path 436, which leads to the sample chamber 314.

After a sample has been captured in the sample chamber 304, the valve 322 may be actuated to seal the sample cavity 314 of the sample chamber 304, as shown in FIG. 3. As shown in FIG. 5, when the valve 322 is actuated, the spool 402 shifts in the direction 416 so that the flow path 432 is no longer connected to the flow path 436. Accordingly, the valve 322 inhibits fluid from entering or exiting the sample chamber 314.

As shown in FIG. 6, another resistor 438 may be included in the wire 420 to allow detection of the position (e.g., actuated or un-actuated) of the valves 322 and 324, as discussed further below with respect to FIG. 10. According to certain embodiments, the resistor 438 may have a different resistance from the resistor 426, allowing the circuit voltage to indicate the position of the valve 322 or 324. For example, the resistor 438 may be a 200 ohm resistor, while the resistor 426 may be a 100 ohm resistor. However, in other embodiments, the resistance of the respective resistors 426 and 438 may vary.

Figure 9:
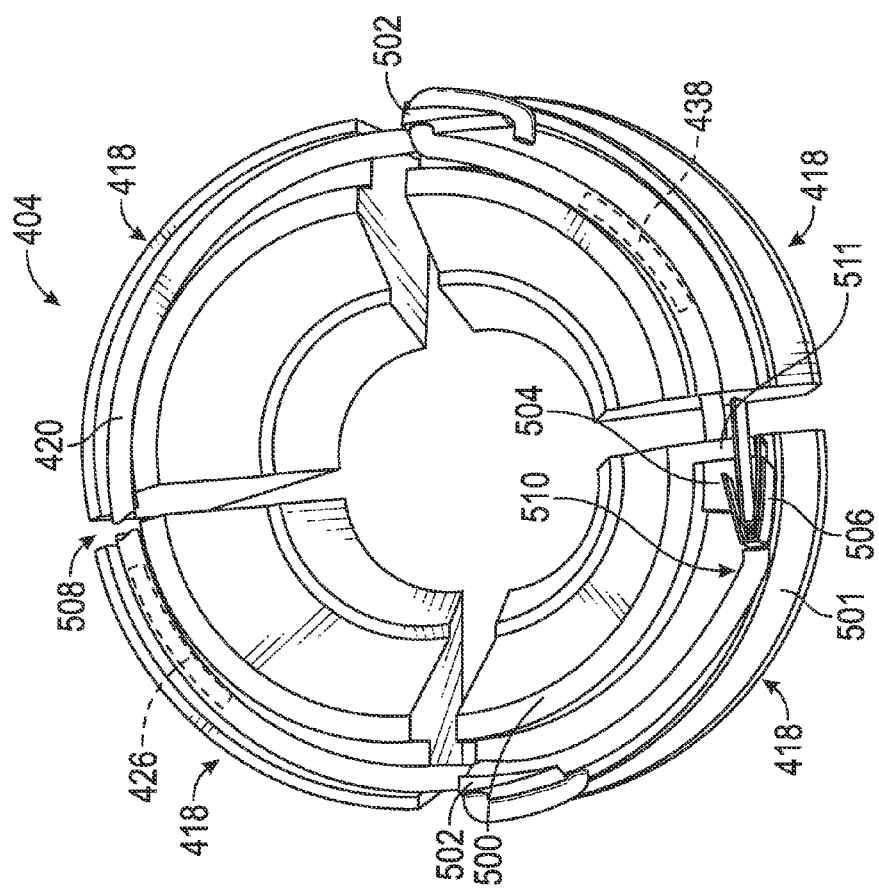
FIG. 9 is a perspective view of the release washer of FIG. 8 in the expanded position, according to aspects of the present disclosure.
Figure 8:
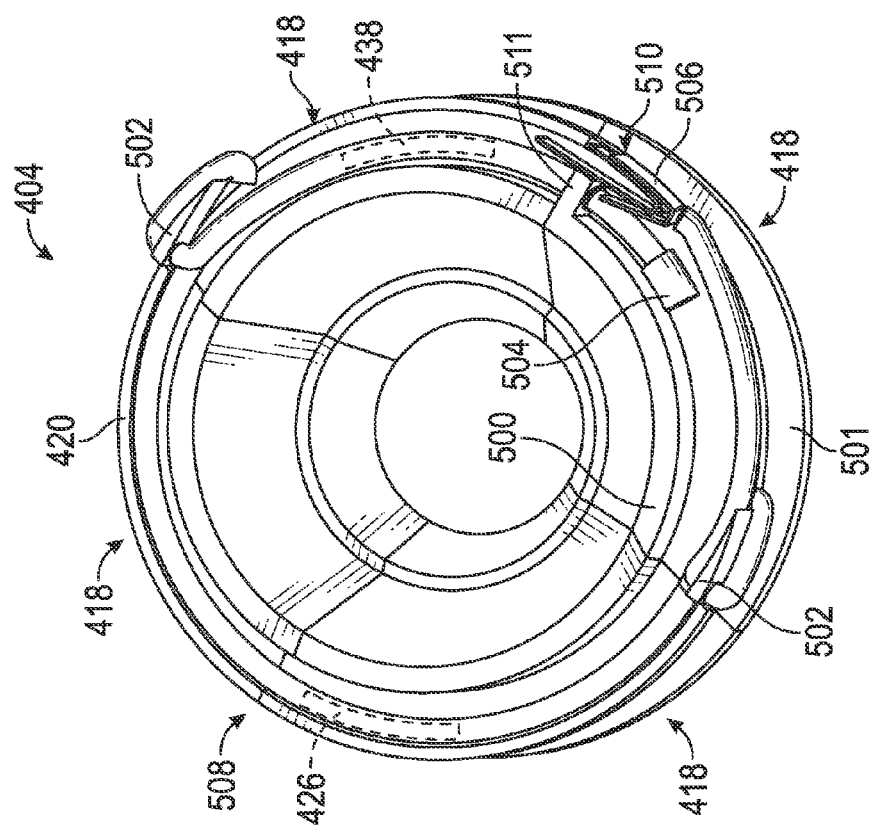
FIG. 8 is a perspective view of an embodiment of a release washer, incorporating a valve shift detection system, that can be employed in the sample directing valves of FIGS. 3-5, according to aspects of the present disclosure.

FIGS. 8 and 9 depict a top view of an embodiment of the release washer 404 that may be employed in the sample directing valves 322 and 324 to detect the position of the valves 322 and 324. FIG. 8 depicts the release washer 404 in the un-actuated position, when the valve is also un-actuated, and FIG. 9 depicts the release washer 404 in the actuated position, when the valve is also actuated.

The release washer 404 includes the wire 420 and the resistors 426 and 438. The wire 420 is disposed on the release washer segments 418 and may be wrapped around a protrusion 500 extending from a surface 501 of the segments 418 to hold the segments 418 together as shown in FIG. 8. According to certain embodiments, the protrusion 500 may extend generally orthogonal to the surface 501 and may extend around the circumference of the release washer 404. The release washer 404 also may include posts 502, or other suitable structures, for coupling the wire 420 to connectors (integral to the post) that may be used to electrically couple the wire 420 to the firing circuit 606 and the status circuit 612, as discussed further below with respect to FIG. 10. One end of the wire 402 includes a first contact element, such as a pin 504, and the other end includes a second contact element, such as a spring leaf 506. When the release washer 404 is contracted as shown in FIG. 8, the pin 504 contacts the insulation of the other end of the wire. When current is applied to the wire 402, the resistor 426 heats up and a portion 508 of the wire 402 melts to disconnect a part of the wire and allow the segments 418 to spread apart. In certain embodiments, the spool 402 and cap 412 (FIGS. 4 and 5) may then move through the center 424 of the release washer 404, thereby further expanding the segments 418. As the segments 418 spread apart, the pin 504 is moved toward the spring leaf 506 to complete a circuit with the resistor 438. Accordingly, the pin 504 and spring leaf 506 may together function as a switch 510 that provides a different voltage when the release washer is expanded, as compared to when the release washer 404 is contracted. A shoulder 511 may extend from the protrusion 500 and may secure the pin 504 adjacent to the spring leaf 506 when the release washer is expanded. According to certain embodiments, the shoulder 500 may extend generally orthogonal to the protrusion 500.

FIG. 10 is a schematic diagram of a valve shift detection system 600 that may be employed to detect the actuation status of the sample directing valves 322 and 324. The system 600 includes a drive board 602 that contains the current source 422, a controller 604, and switches 608. The drive board 602 may be disposed within the sampling modules 132, 222, and 224 (FIGS. 1 and 2), or within other modules of the downhole tools. The controller 604 may govern actuation of the valves 322 and 324, through operation of the switches 608, which may be employed to provide current to the resistors 426 of the release washers 404 to actuate the valves 322 and 324. According to certain embodiments, the controller 604 may include one or more processors and/or control circuitry that executes coded instructions, which may be stored within a memory, to govern actuation of the valves 322 and 324.

The drive board 602 is electrically coupled to the valves 322 and 324. For ease of illustration, the drive board 602 is electrically coupled to two valves 322 and 324; however, as may be appreciated, the drive board 602 may be coupled to any number of valves 322 and 324. The drive board 602 includes the current source 422 (e.g., a constant current source), which provides current to the valves 322 and 324 as part of the firing circuit 606 that actuates the valves 322 and 324. However, in other embodiments, the current source may be replaced by a voltage source. Further, in certain embodiments, additional components, such as analog to digital converters and over voltage protectors, among others, may be included in the drive board 602.

As shown in FIG. 10, the controller 604 may govern operation of the switches 608 to connect the firing circuit 606 to the valves 322 and 324 to actuate the valves 322 and 324. When the firing circuit 606 is connected, the release washer resistors 426 may receive current from the current source 422, which in turn heats the wires 420 to actuate the valves 322 and 324.

The drive board 602 also includes a status circuit 612 that allows the positions of the release washers, and consequently the valve positions, to be detected. According to certain embodiments, the controller 604 may govern operation of the switches 608 so that the status circuit 612 is not active while the firing circuit 606 is active. Accordingly, the firing circuit 606 may be disconnected from valve 322 or 324, after a period of time that would normally be sufficient to cause the washer to release, and then the status circuit 612 may be activated to see if the release washer has properly released, and thereby allowed the valve to shift.

The status circuit 612 includes a differential amplifier 614 designed to detect when the switch 510 has closed (e.g., when the pin 504 contacts the spring leaf 506 as shown in FIG. 9), which in turn indicates that the release washer has successfully released, allowing the valve to shift. The differential amplifier 614 detects and amplifies the difference between a reference voltage, provided by a voltage source 616 and resistors 618, 620, 622, and 624 configured as a first voltage divider, and a detection voltage, provided by a voltage source 626 and resistors 438, 628, 630, and 632, configured as a second voltage divider. The status circuit provides a voltage output 634 that indicates whether the release washer is contracted, as shown in FIG. 6, or expanded, as shown in FIG. 7. Further, the voltage output 634 also may indicate a short circuit where the release washer has not sufficiently released. In this situation, although the release washer has been activated, the release washer may not have fully expanded, and therefore the valve may not have shifted.

The status circuit 612 is provided by way of example and is not intended to be limiting. For example, in other embodiments, the arrangement and number of resistors may vary. In another example, additional components, such as multiplexors may be included. Further, in other embodiments, the status circuit 612 may be configured to detect opening of the switch 510 instead of closing of the switch 510.

Figure 11:
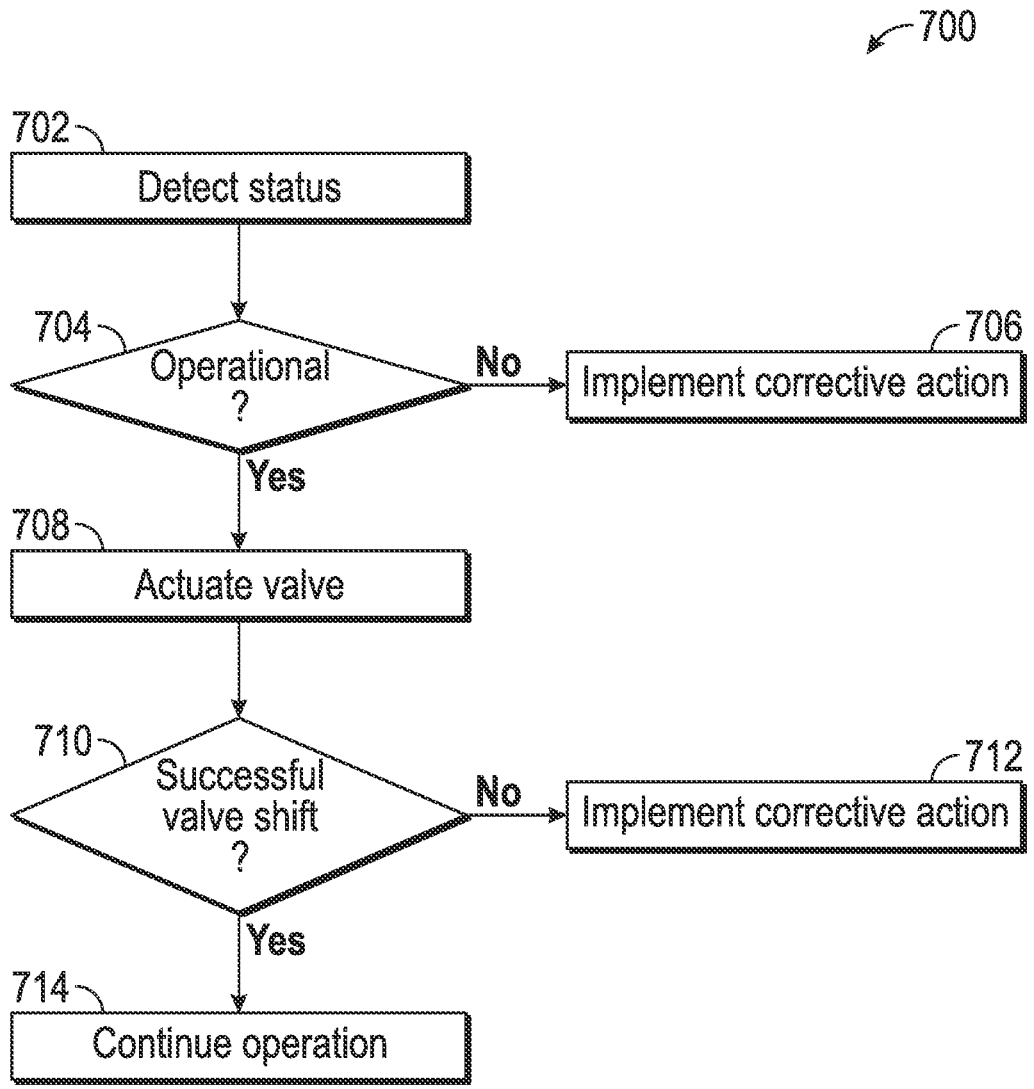
FIG. 11 is a flowchart depicting an embodiment of a method for employing a valve shift detection system, according to aspects of the present disclosure.

FIG. 11 is a flowchart depicting a method 700 that may be employed to operate the valve systems described herein. The method may begin by employing the status circuit 612 to detect (block 702) the status of the release washer, and valve, prior to actuation of a valve 322 or 324. For example, in certain embodiments, the controller 604 may govern operation of the switches 608 to temporarily disconnect the firing circuit 606 and connect the status circuit 612 prior to actuating a valve 322 or 324. The voltage output 634 may indicate (block 704) the operational integrity of the release washer prior to actuating the valve. If the voltage output 634 indicates that the release washer is not operational (e.g., if the voltage output does not correspond to a predetermined value or range of values), the controller 602 may then implement (block 706) corrective action. For example, the controller 602 may govern operation of the switches 608 to disconnect the status circuit 612 and connect the firing circuit 606 to a different valve 322 or 324. In certain embodiments, the controller 602 may select valves 322 and 324 associated with a different sample chamber 304.

If the voltage output 634 indicates that the release washer is functional, the controller 602 may then actuate (block 708), the valve. For example, the controller 602 may disconnect the status circuit 612 and connect the firing circuit 606 to actuate the corresponding valve 322 or 324. The controller 602 may then reconnect the status circuit 612 and disconnect the firing circuit 606 to determine (block 710) whether the release washer, and the associated valve, actuated properly. For example, the controller 602 may determine whether the voltage output 634 corresponds to a predetermine value or a range of values that indicates that the switch 510 has successfully closed. If the voltage output 634 indicates that the release washer did not actuate successfully, the controller 602 may then implement (block 712) corrective action. For example, the controller 602 may re-fire the valve 322 or 324 (e.g., by reconnecting the firing circuit 606 and disconnecting the status circuit 612). In another example, the controller 602 may transmit a signal to cause the downhole tool to take another sample at the current station. The controller 602 may then route the sample fluid to another sample chamber 304 by actuating a different valve, or a different set of valves 322 and 324. On the other hand, if the controller 602 determines (block 714) that a successful valve shift has occurred, operation of the downhole tool may continue (block 716). For example, a sampling operation may proceed as planned with the downhole tool moving to the next station and/or with the controller 606 proceeding to open or close another valve.

FIGS. 12-19 depict additional embodiments of a release washer that includes a switch 510 that enables detection of release washer position, and consequently the valve position. The features shown in FIGS. 12-19 may be incorporated into the housing of the release washer segments 418, for example, within the surface 501 (FIGS. 8 and 9).

Figure 12:
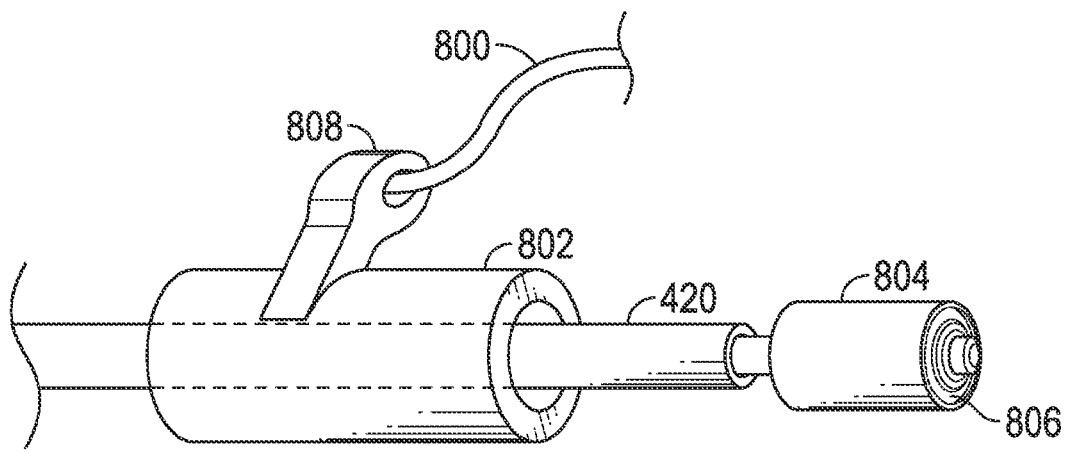
FIG. 12 is a perspective view of another embodiment of a release washer, incorporating a valve shift detection system, that can be employed in the sample directing valves of FIGS. 3-5, according to aspects of the present disclosure.
Figure 13:
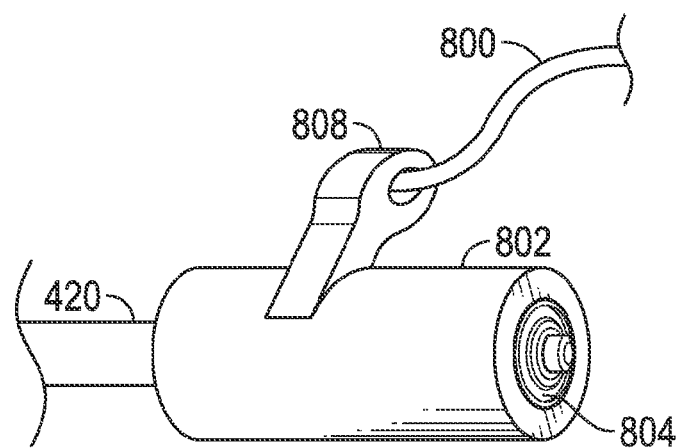
FIG. 13 is a perspective view of the release washer of FIG. 12 in the actuated position, according to aspects of the present disclosure.

In the embodiment shown in FIGS. 12 and 13, the wire 420 extends through a socket 802 that may be disposed in the housing of the release washer 404. The end of the wire 420 extends through a hollow pin 804 and is crimped to a plate 806 that encloses an end of the hollow pin 804. As shown in FIG. 13, when the release washer is expanded, the pin 804 is pulled into the socket 802 to close the switch. A detection wire 800, for electrically coupling the switch to the status circuit 612 (FIG. 10) is connected to a side socket 808 that is attached to the socket 802 in the release washer housing.

FIGS. 14 and 15 depict an embodiment where the release washer housing includes a frame style socket 810, which may be molded plastic or other suitable material. A spring contact 812 extends into the frame 610 and connects to the activation wire 806. When the release washer expands, the pin 804 is pulled into the spring contact 812 to close the switch, as shown in FIG. 15. In other embodiments, the pin 804 may be replaced by a stripped end of the wire 420. In these embodiments, a bulkhead may be disposed in the frame style socket 810 with a hole sized just slightly larger than the wire 420 to allow the wire 420 to pass through upon expansion of the release washer. In yet other embodiments, the insulation of a short section of the wire could be removed, and a knot tied at the end of the wire to stop the wire as it is pulled into the socket 810. Upon actuation, the stripped section of the wire may be positions next to the spring contact to close the switch. In other embodiments, a long section, at the end of the activation wire, could have the insulation removed. As the activation wire is pulled into the socket 810, the stripped wire section would touch the spring contact, closing the switch.

FIGS. 16 and 17 depict an embodiment that includes a socket 814 that has two spring elements 816 and 818 that have raised contact surfaces 820 at the ends. As the release washer expands, the wire 420 moves into the socket 814 and the pin 804 forces the contacts 820 to come together, closing the switch. In certain embodiments, the wire 420 may be designed to break free after closing the switch. In these embodiments, the pin 604 remains in place, holding the contacts 820 together. The spring elements 816 and 818 may include openings 826 for securing wires 822 and 824 to the spring contacts 816 and 818 to electrically couple the contacts 820 to the status circuit 612 (FIG. 10).

Figure 18:
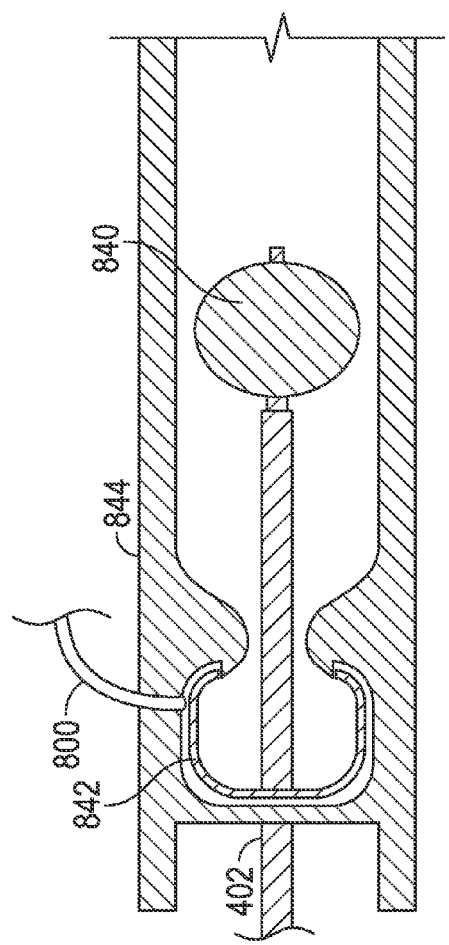
FIG. 18 is a top view of another embodiment of a release washer, incorporating a valve shift detection system, that can be employed in the sample directing valves of FIGS. 3-5, according to aspects of the present disclosure.
Figure 19:
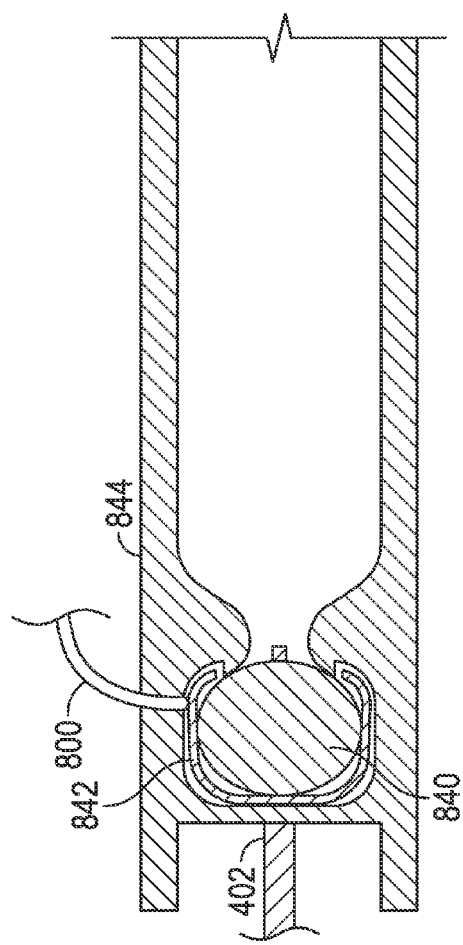
FIG. 19 is a top view of the release washer of FIG. 18 in the actuated position, according to aspects of the present disclosure.

FIGS. 18 and 19 depict an embodiment where a ball 840 may be coupled to an end of the wire 420. When the release washer expands, the ball 840 may be pulled into a recess 842 in the frame 844. An electrical contact 844 may be disposed in the recess 842 and the ball 840 may push the electrical contact 844 into contact with the detection wire 800 when the ball 840 is disposed in the recess 842. In certain embodiments, the wire 420 may be designed to break free after closing the switch. In these embodiments, the ball 840, or other retention mechanism, remains in place, holding the contacts 820 together. In other embodiments, a similar retention scheme could be used with a pin type end, rather than a ball 840.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A valve system comprising:
    a valve comprising a spool moveable from an un-actuated position to an actuated position in response to actuation of the valve;
    a wire to secure the valve in the un-actuated position;
    a first resistor electrically coupled with the wire and configured to release the wire to actuate the valve and move a first component coupled to the wire toward a second component, wherein the first component comprises a pin disposed on a first end of the wire;
    a second resistor electrically coupled with the wire to detect connection of the first component with the second component; and
    a plurality of release washer segments, wherein the wire is disposed around the plurality of release washer segments to retain the plurality of release washer segments in a contracted state when the valve is in the un-actuated position, and wherein the second component comprises a spring element disposed in a socket frame of a housing of one of the plurality of release washer segments.

2. The valve system of claim 1, wherein the second component is coupled to the wire.

3. The valve system of claim 1, wherein the valve comprises a sleeve, wherein the wire retains the spool within the sleeve when the valve is in the un-actuated position, and wherein the spool is slidable within the sleeve to actuate the valve when the wire is released.

4. The valve system of claim 1, comprising a status circuit electrically coupled to the wire to detect whether the wire has been released.

5. The valve system of claim 1, comprising a firing circuit electrically coupled to the wire to supply current to the first resistor to actuate the valve.

6. A valve system comprising:
    a valve comprising a spool slidable within a sleeve from an un-actuated position to an actuated position in response to actuation of the valve;
    a wire coupled to a plurality of release washer segments to retain the plurality of release washer segments in a contracted state that secures the spool within the sleeve in the un-actuated position;
    a first resistor electrically coupled with the wire and configured to release the wire to expand the plurality or release washer segments away from one another to move a first component coupled to the wire toward a second component and to allow the spool to slide within the sleeve to the actuated position, wherein the first component comprises a pin disposed on a first end of the wire and wherein the second component comprises a spring element disposed in a socket frame of a housing of one of the plurality of release washer segments; and
    a second resistor electrically coupled with the wire to detect connection of the first component with the second component.

7. The valve system of claim 6, wherein the plurality of release washer segments are configured to expand in response to sliding of the spool within the sleeve.

8. A method comprising:
    releasing a wire to move a spool from an un-actuated position to an actuated position to actuate a valve;
    expanding a plurality of segments of a release washer away from one another in response to the movement of the spool;
    moving a first component coupled to the wire toward a second component in response to the expansion of the plurality of segments, wherein the first component comprises a pin disposed on a first end of the wire and wherein the second component comprises a spring element disposed in a socket frame of a housing of one of the plurality of release washer segments; and
    detecting a successful actuation of the valve based on a voltage change produced by the first component contacting the second component.

9. The method of claim 8, wherein releasing comprises supplying a current to a resistor electrically coupled to the wire.

10. The method of claim 8, wherein expanding comprises moving a portion of the spool through a center of the plurality of segments.

* * * * *